Feb. 19, 1924. 1,484,034
F. LJUNGSTRÖM
TURBINE PLANT PROVIDED WITH TOOTHED GEARING
Filed Jan. 16, 1922
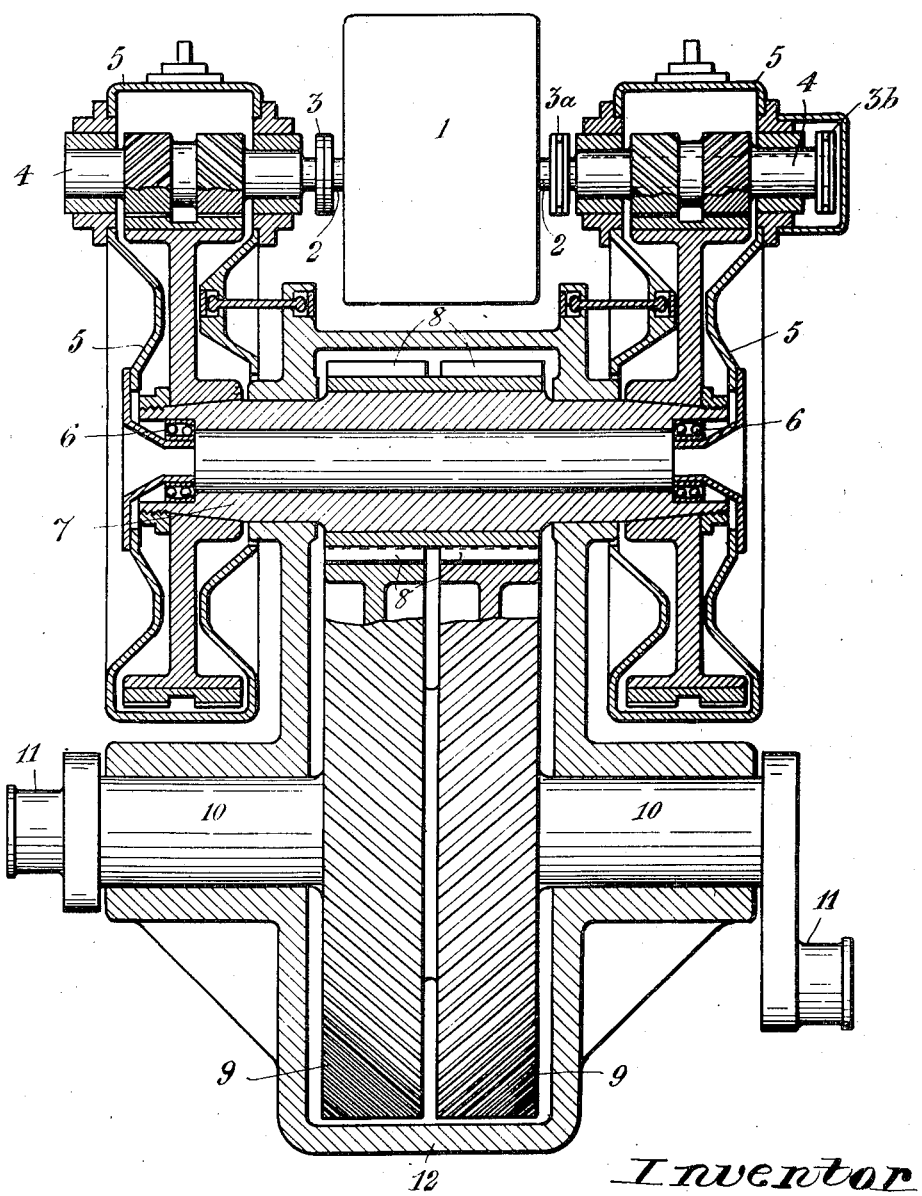
Inventor
F. Ljungström,
By Marks & Clerk
Attys Patented Feb. 19, 1924.

1,484,034

UNITED STATES PATENT OFFICE.

FREDRIK LJUNGSTRÖM, OF BREVIK, SWEDEN, ASSIGNOR TO AKTIEBOLAGET LJUNG-STRÖMS ÅNGTURBIN, OF STOCKHOLM, SWEDEN, A CORPORATION.

TURBINE PLANT PROVIDED WITH TOOTHED GEARING.

Application filed January 16, 1922. Serial No. 529,666.

*To all whom it may concern:*

Be it known that I, FREDRIK LJUNGSTRÖM, a subject of the King of Sweden, residing at Brevik, Lidingon, Sweden, have invented certain new and useful Improvements in Turbine Plants Provided with Toothed Gearings, of which the following is a specification.

In turbine plants provided with toothed gearings it has proved difficult to locate in the most advantageous manner the turbine in relation to the toothed gearing as well as the different toothed wheels within the gearing. In case of marine plants different constructions have been produced; none of them presents, however, a compact form simultaneously with a good engagement of teeth. Either the different groups of gearing have been located in separate places in order to obtain long torsion shafts so as to effect as uniform pressure of teeth as possible, or else, as in U. S. Patent No. 1,130,748, one has rested satisfied with the compact form but been compelled to give up the demand of long torsion shafts giving a good engagement of teeth. In many cases it has, however, proved necessary to provide a connection between the turbine and the gearing affording on the one hand a good engagement of teeth between the different wheels of the gearing and on the other hand occupying a small space. Such a construction is of particular importance in turbine-driven locomotives in which the space is limited by the rather scantily dimensioned loading gauge.

This invention relates to a turbine plant provided with toothed gearing, presenting a good engagement of teeth and as small dimensions as possible, and consists in that the turbine is located between two gear casings containing movably adjustable gearings placed at either side of the next gearing or preferably of an intermediate casing containing the same, the movable gearings being of a type serving the purpose of effecting a uniform pressure of teeth and of replacing the long torsion shafts mentioned above.

The invention further consists in that the gear casings containing the movable gearings are located between the turbine and the range of rotation of a crank provided on a lay shaft supported by the next gearing.

A preferred embodiment of the invention adapted for locomotives is illustrated in the accompanying drawing in sectional view.

Referring to the drawing, 1 designates the turbine actuating by means of its shaft 2 and by the aid of flexible couplings 3 and 3ª the shafts 4 of the toothed wheels. Said shafts 4 are journalled in movable casings 5 in such manner that the toothed wheels are capable of adjusting themselves freely to effect equal pressure of teeth. The casings 5 are supported by ball bearings 6 placed inside the hollow shaft 7. Mounted on said shaft 7 are toothed wheels 8 engaging toothed wheels 9 secured to the shaft 10. For the driving of the locomotive the latter shaft is provided with cranks 11. Said lay shaft 10 is journalled in the same intermediate gear casing 12 as the intermediate shaft 7.

In case the gearing be constructed for backwards running the extra toothed wheels necessary for that purpose are preferably also journalled in the said intermediate gear casing 12. Should a turbine having double rotation be used, reversing gearings are disposed within the casings 5.

In order to effect certain axial movements of the shaft 2 in relation to the adjustable toothed wheel systems, the flexible couplings 3 and 3ª consist preferably of diaphragms.

Such axial movements may arise on the one hand owing to the toothed wheels on the shafts 4 requiring an axial movement in order to be adjusted to equal pressure of teeth, and on the other hand on account of variations of temperature.

If the turbine plant be used for instance for the driving of vessels, the lay shaft is arranged without cranks and coupled directly or indirectly to the propeller shaft.

Obviously a gearing constructed according to the invention occupies a very small space, since all the toothed wheels may be placed close to one another without the use of long torsion shafts, a good engagement of teeth being nevertheless obtained.

The turbine may be located at the side of the gearing. In case of driving locomotives it is however, the most appropriate way to place the turbine above the intermediate gear casing 12.

The arrangement is usable in gearings having straight as well as skew teeth.

What I claim as new and desire to secure by Letters Patent of the United States is:—

1. In combination, a turbine, gear casings arranged at opposite sides of said turbine and each containing movably adjustable gearings driven by the turbine, and an intermediate gearing arranged between said casings and driven by the movably adjustable gearings, said gear casings being movably and adjustably mounted.

2. A combination as claimed in claim 1 in which the intermediate gearing is provided with a driven shaft, and a crank fixed to said shaft, one of said gear casings being arranged in such relation relatively to said crank as to permit the rotation of said crank past one side of said casing.

3. In combination, a turbine having a shaft, flexible couplings arranged at the ends of said shaft, extension shafts connected to said couplings and provided with gears, an intermediate casing arranged directly below said turbine and provided with a shaft, outer gear casings movably and adjustably supported, gears mounted upon the last mentioned shaft and engaging the gears on the extension shafts, said casings being arranged on opposite sides of the intermediate casing, gears arranged intermediate the ends of the shaft of the intermediate casing, and a second shaft arranged in the intermediate casing and having gears engaging the last mentioned gears.

4. In combination, a turbine, gear casings arranged at opposite sides of said turbine and each containing movably adjustable gearings driven by the turbine, and an intermediate casing arranged between said casings and containing an intermediate gearing driven by the movably adjustable gearings, said first mentioned casings being movably and adjustably mounted.

In testimony whereof I affix my signature in presence of two witnesses.

FREDRIK LJUNGSTRÖM.

Witnesses:
D. BERGRON SEVILLE,
ERIC HATJS.